(12) United States Patent
Plusquellic et al.

(10) Patent No.: US 11,095,461 B2
(45) Date of Patent: Aug. 17, 2021

(54) SYSTEM AND METHODS FOR ENTROPY AND STATISTICAL QUALITY METRICS IN PHYSICAL UNCLONABLE FUNCTION GENERATED BITSTRINGS

(71) Applicant: STC.UNM, Albuquerque, NM (US)

(72) Inventors: James Plusquellic, Albuquerque, NM (US); Wenjie Che, Albuquerque, NM (US)

(*) Notice: Subject to any disclaimer, the term of this patent is extended or adjusted under 35 U.S.C. 154(b) by 161 days.

(21) Appl. No.: 16/346,772

(22) PCT Filed: Nov. 3, 2017

(86) PCT No.: PCT/US2017/059961
§ 371 (c)(1),
(2) Date: May 1, 2019

(87) PCT Pub. No.: WO2018/085676
PCT Pub. Date: May 11, 2018

(65) Prior Publication Data
US 2019/0268170 A1 Aug. 29, 2019

Related U.S. Application Data

(60) Provisional application No. 62/417,611, filed on Nov. 4, 2016, provisional application No. 62/505,502, filed on May 12, 2017.

(51) Int. Cl.
*H04L 29/06* (2006.01)
*H04L 9/32* (2006.01)
(Continued)

(52) U.S. Cl.
CPC ............ *H04L 9/3278* (2013.01); *G06F 17/10* (2013.01); *G06F 21/44* (2013.01); *G09C 1/00* (2013.01)

(58) Field of Classification Search
CPC ....... H04L 9/3278; G06F 17/10; G06F 21/44; G09C 1/00
See application file for complete search history.

(56) References Cited

U.S. PATENT DOCUMENTS

| | | | | |
|---|---|---|---|---|
| 6,028,527 A | * | 2/2000 | Soenen | ...................... H04L 9/12 340/12.23 |
| 6,904,150 B1 | * | 6/2005 | Dent | ....................... H04L 9/304 380/28 |

(Continued)

FOREIGN PATENT DOCUMENTS

| WO | 2013083415 A3 | 6/2013 |
|---|---|---|
| WO | 2016100402 A1 | 6/2016 |

OTHER PUBLICATIONS

Sahoo, Durga Prasad; Chakraborty, Rajat Subhra; Mukhopadhyay, Debdeep; "Towards Ideal Arbiter PUF Design on Xilinx FPGA: a Practitioner's Perspective", Euromicro Conference on Digital System Design, IEEE, Aug. 26-28, 2015, pp. 559-562.*

(Continued)

*Primary Examiner* — Victor Lesniewski
(74) *Attorney, Agent, or Firm* — Valauskas Corder LLC (57) ABSTRACT

The Distribution Effect is proposed for the HELP PUF that is based on purposely introducing biases in the mean and range parameters of path delay distributions to enhance entropy. The biased distributions are then used in the bitstring construction process to introduce differences in the bit values associated with path delays that would normally remain fixed. Offsets are computed to fine tune a token's digitized path delays as a means of maximizing entropy and reproducibility in the generated bitstrings: a first population-based offset method computes median values using data from multiple tokens (i.e., the population) and a second (Continued)

chip-specific technique is proposed which fine tunes path delays using enrollment data from the authenticating token.

3 Claims, 8 Drawing Sheets

(51) Int. Cl.
*G06F 21/44* (2013.01)
*G09C 1/00* (2006.01)
*G06F 17/10* (2006.01)

(56) References Cited

U.S. PATENT DOCUMENTS

| | | | |
|---|---|---|---|
| 7,653,849 B1* | 1/2010 | Tabatabaei | G01R 31/318508 714/726 |
| 7,904,731 B2* | 3/2011 | Devadas | G09C 1/00 713/189 |
| 8,610,454 B2* | 12/2013 | Plusquellic | H04L 9/0861 326/8 |
| 9,449,153 B2* | 9/2016 | Guo | G06F 21/10 |
| 10,770,134 B2* | 9/2020 | Lin | G09C 1/00 |
| 2001/0003507 A1* | 6/2001 | Maruyama | G11C 16/28 365/185.2 |
| 2003/0204743 A1* | 10/2003 | Devadas | G06Q 20/3674 726/9 |
| 2006/0271793 A1* | 11/2006 | Devadas | G06F 21/31 713/189 |
| 2011/0055649 A1* | 3/2011 | Koushanfar | G06F 21/577 714/729 |
| 2011/0066670 A1* | 3/2011 | Yu | G06F 7/582 708/252 |
| 2011/0215829 A1* | 9/2011 | Guajardo Merchan | H01L 23/544 326/8 |
| 2012/0072737 A1* | 3/2012 | Schrijen | H04L 9/304 713/189 |
| 2012/0319724 A1* | 12/2012 | Plusquellic | H04L 9/0861 326/8 |
| 2013/0003438 A1* | 1/2013 | Merkel | G11C 13/0061 365/148 |
| 2013/0147511 A1* | 6/2013 | Koeberl | H04L 9/3263 326/8 |
| 2014/0103344 A1* | 4/2014 | Tehranipoor | G01R 31/31725 257/48 |
| 2014/0108786 A1* | 4/2014 | Kreft | G06F 21/335 713/156 |
| 2014/0189890 A1* | 7/2014 | Koeberl | H04L 9/0866 726/34 |
| 2014/0201851 A1* | 7/2014 | Guo | G06F 1/26 726/34 |
| 2014/0208178 A1* | 7/2014 | Sunter | G01R 31/3177 714/731 |
| 2014/0325237 A1* | 10/2014 | Van Der Leest | H04L 9/0866 713/189 |
| 2015/0026532 A1* | 1/2015 | Clouqueur | G01R 31/318541 714/726 |
| 2015/0058928 A1* | 2/2015 | Guo | H04L 63/0876 726/3 |
| 2016/0065378 A1 | 3/2016 | Kim et al. | |
| 2016/0182045 A1* | 6/2016 | Mai | G09C 1/00 326/8 |
| 2016/0285639 A1* | 9/2016 | Mathew | G06Q 10/08 |
| 2016/0344709 A1* | 11/2016 | Sadhasivan | G09C 1/00 |
| 2017/0134175 A1* | 5/2017 | Skudlarek | G09C 1/00 |

OTHER PUBLICATIONS

Zheng, Yu; Zhang, Fengchao; Bhunia, Swarup; "DScanPUF: A Delay-Based Physical Unclonable Function Built Into Scan Chain", Transactions on Very Large Scale Integration (VLSI) Systems, IEEE, vol. 24, Issue 3, Mar. 2016, pp. 1059-1070.*
Zalivaka, Siarhei S.; Puchkov, Alexander V.; Klybik, Vladimir P.; Ivaniuk, Alexander A.; Chang, Chip-Hong; "Multi-valued Arbiters for Quality Enhancement of PUF Responses on FPGA Implementation", 21st Asia and South Pacific Design Automation Conference (ASP-DAC), IEEE, Jan. 25-28, 2016, pp. 533-538.*
International Search Report, dated May 4, 2018. ISU:ROSPATENT.
J. Aarestad, J. Plusquellic, D. Acharyya, "Error-Tolerant Bit Generation Techniques for use with a Hardware-Embedded Path Delay PUF," HOST, 2013, pp. 151-158.
W. Che, F. Saqib, J. Plusquellic, "PUF-Based Authentication", ICCAD, 2015, pp. 337-344.
R. van den Berg, B. Skoric, and V. van der Leest, "Bias-based modeling and entropy analysis of PUFs", TrustED'13, 2013.
S. Katzenbeisser, U. Kocabas, V. Rozic, A. Sadeghi, I. Verbauwhede and C. Wachsmann, "PUFs: Myth, Fact or Busted? A Security Evaluation of Physically Unclonable Functions (PUFs) Cast in Silicon", CHES 2012, pp. 283-301.
D. Ganta and L. Nazhandali, "Easy-to-Build Arbiter Physical Unclonable Function with Enhanced Challenge/Response Set," in International Symposium on Quality Electronic Design, ISQED 2013, Mar. 2013, pp. 733-738.
M. Majzoobi, F. Koushanfar, and S. Devadas, "FPGA PUF using Programmable Delay Lines", WIFS, 2010, pp. 1-6.
T. Machida, D. Yamamoto, M. Iwamoto, and K. Sakiyama, "A New Mode of Operation for Arbiter PUF to Improve Uniqueness on FPGA", FedCSIS, 2014, pp. 871-878.
A. Maiti and P. Schaumont, "Improving the Quality of a Physical Unclonable Function Using Configurable Ring Oscillators", FPL'09, 2009, pp. 703-707.
C.-E. Yin, G. Qu, "Improving PUF Security with Regression based Distiller", DAC, 2013.
D. P. Sahoo, R H. Nguyen, R. S. Chakraborty, and D. Mukhopadhyay, "Architectural Bias: a Novel Statistical Metric to Evaluate Arbiter PUF Variants", IACR Cryptology ePrint Archive, Report 2016/057, 2016.

* cited by examiner

SYSTEM AND METHODS FOR ENTROPY AND STATISTICAL QUALITY METRICS IN PHYSICAL UNCLONABLE FUNCTION GENERATED BITSTRINGS

CROSS-REFERENCE TO RELATED APPLICATIONS

This application claims the benefit of U.S. Provisional Application No. 62/417,611 filed Nov. 4, 2016, and U.S. Provisional Application No. 62/505,502 filed on May 12, 2017.

FIELD OF THE INVENTION

The invention relates to authentication protocols for a Physically Unclonable Function ("PUF") including a Hardware-embedded Delay PUF ("HELP"). In particular, the invention relates to leveraging distributions in a PUF and improving bitstring quality.

BACKGROUND OF THE INVENTION

Security and trust have become critically important for a wide range of existing and emerging microelectronic systems including those embedded in aerospace and defense, industrial ICS and SCADA environments, automotive and autonomous vehicles, data centers, communications and medical healthcare devices. The vulnerability of these systems is increasing with the proliferation of internet-enabled connectivity and unsupervised in-field deployment. Authentication and encryption are heavily used for ensuring data integrity and privacy of communications between communicating devices. These protocols require keys and bitstrings (secrets) to be stored in non-volatile memory (NVM). Current methods utilizing a NVM-based key represent a vulnerability, particularly in fielded systems where adversaries can access the hardware and carry out probing and other invasive attacks uninhibited. Physical unclonable functions or PUFs on the other hand provide an alternative to key-storage in NVM, and for the generation of unique and untrackable authentication information.

A Physical Unclonable Function (PUF) is a next-generation hardware security primitive. Security protocols such as authentication and encryption can leverage the random bitstring and key generation capabilities of PUFs as a means of hardening vulnerable mobile and embedded devices against adversarial attacks. Authentication is a process that is carried out between a hardware token (e.g., smart card) and a verifier (e.g., a secure server at a bank) that is designed to confirm the identities of one or both parties. With the Internet-of-Things (IoT), there are a growing number of authentication applications in which the hardware token is resource-constrained. Conventional methods of authentication which use area-heavy cryptographic primitives and non-volatile memory (NVM) are less attractive for these types of evolving embedded applications. PUFs, on the other hand, can address issues related to low cost because they can potentially eliminate the need for NVM. Moreover, the special class of strong PUFs can further reduce area and energy overheads by eliminating crypto-graphic primitives that would otherwise be required.

A PUF measures parameters that are random and unique on each IC, as a means of generating digital secrets (bitstrings). The bitstrings are generated in real time, and are reproducible under a range of environmental variations. The elimination of NVM for key storage and the tamper evident property of PUFs to invasive probing attacks represent significant benefits for authentication applications in resource-constrained environments.

Many existing PUF architectures utilize a dedicated on-chip array of identically-designed elements. The parameters measured from the individual elements of the array are com-pared to produce a finite number of challenge-response-pairs (CRPs). When the number of challenges is polynomial in size, the PUF is classified as weak. Weak PUFs require secure hash and/or other types of cryptographic functions to obfuscate the challenges, the responses or both when used in authentication applications. In contrast, the number of challenges is exponential for a strong PUFs, making exhaustive readout of the CRP space impractical. However, in order to be secure, a truly strong PUF must also be resilient to machine learning algorithms, which attempt to use a subset of the CRP space to build a predictive model.

A PUF is defined by a source of on-chip electrical variations. The hardware-embedded Delay PUF (HELP) generates bitstrings from delay variations that occur along paths in an on-chip macro (functional unit), such as a cryptographic primitive (i.e., such as the data path component of the Advanced Encryption Standard (AES) algorithm). Therefore, the circuit structure that HELP utilizes as a source of random information differs from traditional PUF architectures which use precisely placed and routed arrays of identically designed components. In contrast, HELP imposes no restrictions on the physical layout characteristics of the entropy source.

The HELP processing engine defines a set of configuration parameters which are used to transform the measured path delays into bitstring responses. One of these parameters, called the Path-Select-Mask provides a mechanism to choose k paths from n that are produced, which enables an exponential number of possibilities. However, resource-constrained versions of HELP typically restrict the number of paths to the range of 220. Therefore, the CRP space of HELP is not large enough to satisfy the conditions of a truly strong PUF unless mechanisms are provided by the HELP algorithm to securely and significantly expand the number of path delays that can be compared to produce bitstrings.

HELP reduces the bias introduced by differences in the physical path length by applying a Modulus operation to the measured path delays. The Modulus operator computes the remainder after dividing the path delay by specified constant, i.e., the Modulus. The Modulus is chosen to ideally eliminate the large bias which can be present when paths vary widely in length (and delay), while simultaneously preserving the smaller variations that occur because of random processes, e.g., within-die process variations. The best choice of the Modulus makes any arbitrary pairings of path delays a random variable.

In order to ensure that bias is removed for every path pairing combination, the Modulus needs to be as small as possible. This is true because the magnitude of the randomly varying component of path delays differs based on the length of the paths used in each pairing. Unfortunately, the Modulus is lower bounded by measurement (thermal, jitter and etc.), temperature and supply voltage noise sources. Therefore, the range of suitable moduli that achieve the PUF's primary goals of producing unique, random and reproducible bitstrings is limited.

Hence there is a need for a system and methods that improves entropy, reliability and the length of the HELP generated bitstring in addition to securely and significantly expanding the number of path delays that can be compared to produce bitstrings. The invention satisfies this need.

SUMMARY OF THE INVENTION

A special class of Physical Unclonable Functions (PUFs) referred to as strong PUFs can be used in novel hardware-based authentication protocols. Strong PUFs are required for authentication because the bitstrings and helper data are transmitted openly by the token to the verifier and therefore, are revealed to the adversary. This enables the adversary to carry out attacks against the token by systematically applying challenges and obtaining responses in an attempt to machine-learn and later predict the token's response to an arbitrary challenge. Therefore, strong PUFs must both provide an exponentially large challenge space and be resistant to machine learning attacks in order to be considered secure.

According to the invention, a transformation referred to as "TVCOMP" used within the HELP bitstring generation algorithm that increases the diversity and unpredictability of the challenge-response space and therefore increases resistance to model-building attacks. "TV" refers to temperature and supply voltage while "TVCOMP" refers to temperature and voltage compensation. HELP leverages within-die variations in path delays as a source of random information. TVCOMP is a linear transformation designed specifically for dealing with changes in delay introduced by adverse temperature-voltage (environmental) variations. TVCOMP also increases entropy and expands the challenge-response space dramatically.

Statistical properties including uniqueness, randomness and reproducibility are commonly used as metrics for Physical Unclonable Functions (PUFs). When PUFs are used in authentication protocols, the first two metrics are critically important to the overall security of the system. Authentication reveals the bitstrings (and helper data if used) to the adversary, and makes the PUF vulnerable to tactics that can lead to successful cloning and impersonation. Two techniques are presented that improve the statistical quality of the bitstrings: population-based and chip-specific. The verifier computes a set of offsets that are used to fine tune the token's digitized path delays as a means of maximizing entropy and reproducibility in the generated bitstrings. The offsets are derived from the enrollment data stored by the server in a secure database. A population-based offset method computes median values using data from multiple tokens (the population). A second chip-specific offset method fine tunes path delays using enrollment data from the authenticating token.

TVCOMP is an operation carried out within the HELP bitstring generation process that is designed to calibrate for variations in path delays introduced by changes in environmental conditions. Therefore, the primary purpose of TVCOMP is unrelated to entropy, but rather is a method designed to improve reliability.

The HELP bitstring generation process begins by selecting a set of k paths, typically 4096, from a larger set of n paths that exist within the on-chip macro. A series of simple mathematical operations are then performed on the path delays. The TVCOMP operation is applied to the entire distribution of k path delays. It first computes the mean and range of the distribution and then applies a linear transformation that standardizes the path delays, i.e., subtracts the mean and divides each by the range, as a mechanism to eliminate any changes that occur in the delays because of adverse environmental conditions.

The standardized values therefore depend on the mean and range of the original k-path distribution. For example, a fixed path delay that is a member of two different distributions, with different mean and range values, will have different standardized values. This difference is preserved in the remaining steps of the bitstring generation process. Therefore, the bit generated for a fixed path delay can change from 0-to-1 or 1-to-0 depending on the mean and range of the distribution. This dependency between the bit value and the parameters of the distribution is referred to as the "Distribution Effect". Distribution Effect adds uncertainty for algorithms attempting to learn and predict unseen CRPs.

Although there are n-choose-k ways of creating a set of k-path distributions (an exponential), there are only a polynomial number of different integer-based means and ranges that characterize these distributions, and of these, an even smaller portion actually introduce changes in the bit value derived from a fixed path delay. Unfortunately, deriving a closed form expression for the level of CRP expansion is difficult at best, and in fact, may not be possible. Instead, an alternative empirical-based approach is taken to derive an estimate. The bitstring diversity introduced by Distribution Effect using Interchip Hamming distance is evaluated.

The real strength of the Distribution Effect is related to the real time processing requirements of attacks carried out using machine learning algorithms. With Distribution Effect, the machine learning algorithm constructs an estimate of the actual k-path distribution. This in turn requires detailed information about the layout of the on-chip macro, and an algorithm that quickly decides which paths are being tested for the specific set of server-selected challenges used during an authentication operation. Moreover, the machine learning algorithm produces a prediction in real time and only after the server transmits the entire set of challenges to the authenticating token. The implications of the Distribution Effect are two-fold. First, HELP can leverage smaller functional units and still achieve an exponential number of challenge-response-pairs (CRPs) as required of a strong PUF. Second, the difficulty of model-building HELP using machine learning algorithms is more difficult because the path delays from the physical model are no longer constant.

With the limited range of suitable moduli that achieve the PUF's primary goals of producing unique, random and reproducible bitstrings, two methods—population-based and chip-specific—are provided that improve entropy, reliability and the length of the HELP generated bitstrings. The population-based offset method widen the range of suitable Moduli that can be used while maintaining zero-information leakage in the helper data. Information leakage associated with the chip-specific offset method can be kept near zero with constraints imposed on the parameters used by the HELP engine.

The offset methods are described in reference to a PUF-based authentication scenario, which occurs between a hardware token and a verifier. According to the authentication protocol, a set of path delays are collected and stored by the verifier in a secure database during the enrollment process, i.e., before the token is released for field use. The proposed population-based offset method also requires the verifier to compute and store a set of median values of each path delay using the enrollment data of all tokens (the population). During authentication, the verifier selects a Modulus and then computes the difference between the mean path delay and the Modulus, and encodes the differences (called offsets) in the challenge data sent to the token. The token and verifier add the offsets to the path delays before computing the corresponding bit. The offsets effectively shift the distributions of the path delays such that approximately half of the chips generate a '0' and half generate a '1', maximizing the entropy of each generated bit.

The invention provides close form expressions are given that specify the parameters used and the trade-offs associated with the population-based and chip-specific based offset methods. The invention provides improvements in reliability and bitstring size when the chip-specific offset method is combined with the population-based offset method and previously proposed dual-helper data scheme.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention.

DETAILED DESCRIPTION OF THE INVENTION

Figure 1:
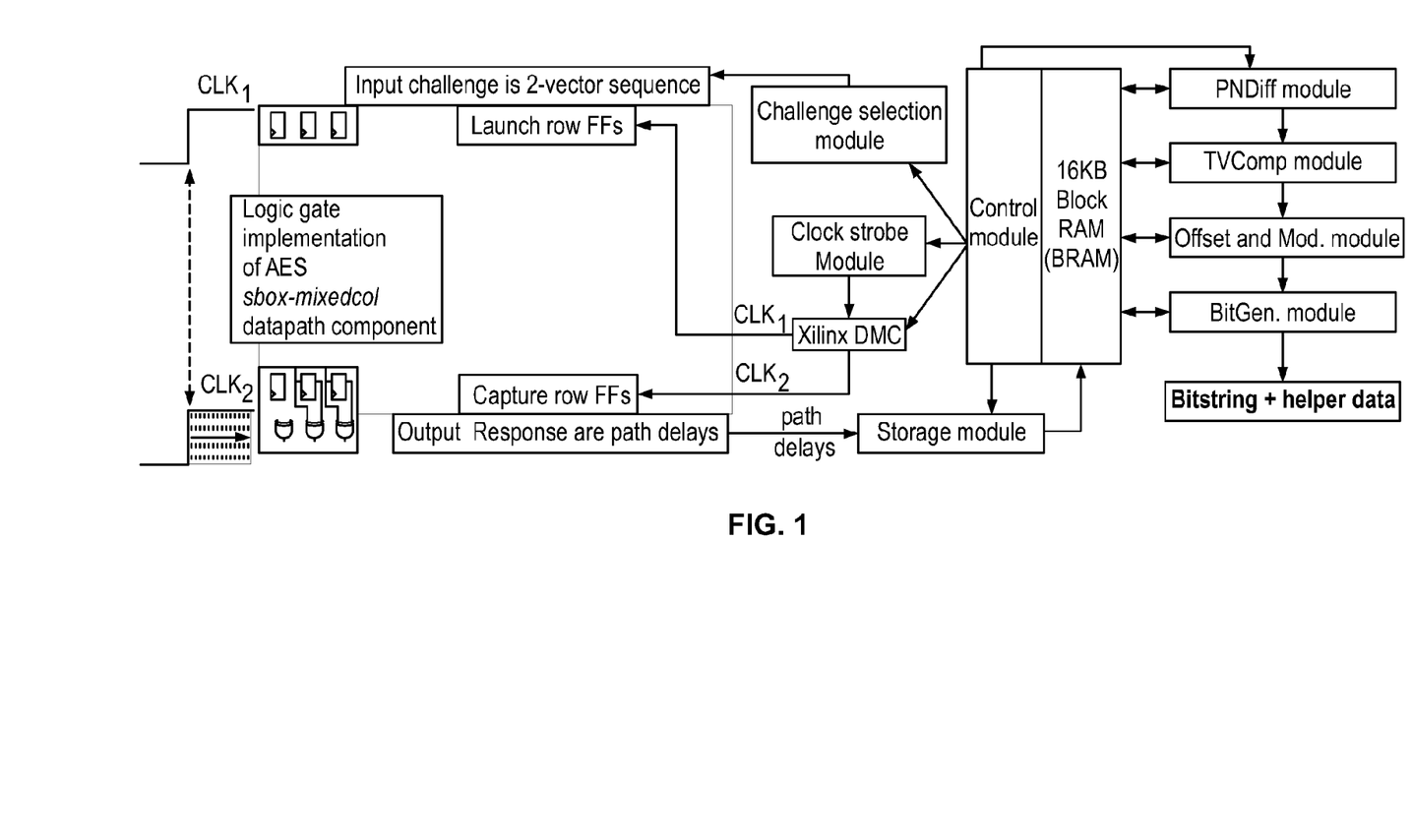
FIG. 1 is a block diagram of the HELP entropy source and HELP processing engine according to an embodiment of the invention.

HELP attaches to an on-chip module, such as a hardware implementation of the cryptographic primitive, as shown in FIG. 1. The logic gate structure of the functional unit defines a complex interconnection network of wires and transistors. The left side of FIG. 1 shows sequences of logic gates that define several paths within a typical logic circuit (which is also referred to as the functional unit). Unlike other proposed PUF structures, the functional unit used by HELP is an arbitrary, tool-synthesized netlist of gates and wires, as opposed to a carefully structured physical layout of identically-designed test structures such as ring oscillators.

The functional unit shown in FIG. 1 is a 32-bit column from Advanced Encryption Standard (AES), which includes 4 copies of the SBOX and 1 copy of the MIXED-COL, and is referred to as "sbox-mixedcol". This combinational data path component is implemented in a hazard free logic style known as a Wave Dynamic Differential Logic (WDDL) logic style, which doubles the number of primary inputs and primary outputs to 64. Although the invention uses sbox-mixedcol, the AES SBOX provides a lighter weight alternative with approximately 600 LUTs.

HELP accepts challenges as 2-vector sequences. The vector sequences are applied to the primary inputs of the functional unit and the delays of the sensitized paths are measured at the primary outputs. Path delay is defined as the amount of time ($\Delta t$) it takes for a set of 0-to-1 and 1-to-0 transitions introduced on the primary inputs to propagate through the logic gate network and emerge on a primary out-put. HELP uses a clock-strobing technique to obtain high resolution measurements of path delays as shown on the left side of FIG. 1. A series of launch-capture operations are applied in which the vector sequence that defines the input challenge is applied repeatedly using the Launch row flip-flops (FFs) and the output responses are measured using the Capture row FFs. On each application, the phase of the capture clock, $Clk_2$, is incremented forward with respect to $Clk_2$, by small $\Delta ts$ (approximately 18 ps), until the emerging signal transition is successfully captured in the Capture row FFs. A set of XOR gates connected between the inputs and outputs of the Capture row FFs provide a simple means of determining when this occurs. When an XOR gate value becomes 0, then the input and output of the FF are the same (indicating a successful capture). The first occurrence in which this occurs during the clock strobing operation causes the current phase shift value to be recorded as the digitized delay value for this path. The current phase shift value is referred to as the launch-capture-interval (LCI). The clock strobe module is shown in the center portion of FIG. 1.

The digitized path delays are collected by a storage module and stored in an on-chip block RAM (BRAM). A set of Path-Select-Masks are also sent by the verifier, along with the challenges, to allow specific path delays to be selected or discarded. Each digitized timing value is stored as a 16-bit value, with 12 binary digits serving to cover a signed range of [−2048, 2047] and 4 binary digits of fixed point precision to enable up to 16 samples of each path delay to be averaged. The upper half of the 16 KB BRAM shown in FIG. 1 allows 4096 path delays to be stored. The applied challenges and masks are configured to test 2048 paths with rising transitions and 2048 paths with falling transitions. The digitized path delays are referred to as PUFNums or PN.

The bitstring generation process is carried out using the stored PN as input. Once the PN are collected, a sequence of mathematical operations are applied as shown on the right side of FIG. 1 to produce the bitstring and helper data. The first operation is performed by the PNDiff module. PN differences (PNDiff) creates PN differences by subtracting the 2048 falling PN from the 2048 rising PN. The PNDiff module creates unique, pseudo-random pairings between the rising and falling PN using two 11-bit linear feedback shift registers (LFSRs). The LFSRs each require an 11-bit LFSR seed to be provided as input during the first iteration of the algorithm. The two LFSR seeds can be varied from one run of the HELP algorithm to the next. We refer to the LFSR seeds as user-specified configuration parameters. The term PND is used subsequently to refer to the PN differences. The PNDiff module stores the 2048 PND in a separate portion of the BRAM.

The TVCOMP process measures the mean and range of the PND distribution and applies a linear transformation to the original PND as a means of removing TV-related variations. A histogram distribution of the 2048 PND is created and parsed to obtain its mean and range parameters. Changes in the mean and range of the PND distribution capture the shifting and scaling that occurs to the delays when temperature and/or supply voltage vary above or below the nominal values. The mean and range parameters, $\mu_{chip}$ and $Rng_{chip}$, are used to create standardized values, $zval_i$, from the original PND according to Eq. (1).

$$zval_i = \frac{(PND_i - \mu_{chip})}{Rng_{chip}} \quad \text{Equation (1)}$$

$$PND_c = zval_i Rng_{ref} + \mu_{ref} \quad \text{Equation (2)}$$

The fractional $zval_i$ are then transformed back into fixed point values using Eq. (2). That is, the zvals are translated to a new distribution with mean $\mu_{ref}$ and range $Rng_{ref}$. The $\mu_{ref}$ and $Rng_{ref}$ are also user-specified parameters of the HELP algorithm. The TV compensated PND are referred to as $PND_c$. The variations that remain in the $PND_c$ are those introduced by within-die variations (WDV) and uncompensated TV noise (UC-TVN).

In addition to TV-related variations, TVCOMP also eliminates global (chip-wide) performance differences that occur between chips, leaving only within-die variations (WDV). WDV are widely recognized as the best source of Entropy for PUFs. Uncompensated TV noise (TVN) is portrayed by the variations in each wave-form that occur across TV corners. The probability of a bit-flip error during bitstring regeneration is directly related to the magnitude of TVN. The primary purpose of TVCOMP is to minimize TVN and therefore, to improve the reliability of bitstring regeneration. However, TVCOMP can also be used to improve randomness and uniqueness in the enrollment-generated bitstrings. The variations that remain in the $PND_c$ are those introduced by within-die variations (WDV) and uncompensated TV noise (UC-TVN). UC-TVN sets the low bound on the range of suitable moduli as discussed earlier, while WDV defines the upper bound.

The Offset and Modulus operations are applied last in the process shown on the right side of FIG. 1. The Modulus module applies a final transformation to the $PND_c$. Modulus is a standard mathematical operation that computes the positive remainder after dividing by the modulus. The bias introduced by testing paths of arbitrary length reduces randomness and uniqueness in the generated bitstrings. The Modulus operation significantly reduces, and in some cases eliminates, large differences in the lengths of the tested paths. The value of the Modulus is also a user-specified. The term $modPND_c$ is used to refer to the values used in the bitstring generation process, or final value after modulus operation on $PND_c$.

The offset methods according to the invention extend the range of suitable Moduli upwards while maintaining or improving the randomness, uniqueness and reproducibility statistical quality metrics of the generated bitstrings.

Offsets are added to the $PND_c$ to produce PND after compensation and offset operation ($PND_{co}$). The Modulus operator computes the positive remainder after dividing the $PND_{co}$ by the Modulus value. The final values are referred to as $modPND_{co}$. The offsets are computed by the server and transmitted to the token as a component of the challenge. The HELP user-specified parameters, are used to expand the challenge-response space of HELP and they are derived from a XORed nonce generated by the token and the verifier for each authentication. The bitstring generation process uses a fifth user-specified parameter, called the Margin, as a means of improving reliability. HELP classifies the mod-$PND_c$ or $modPND_{co}$ as strong (s) and weak (w) based on their position within the range defined by the Modulus.

The Margin method improves bitstring reproducibility by eliminating data points classified as 'weak' in the bitstring generation process. Data points that introduce bit flip errors at one or more of the TV corners during regeneration because at least one of the regeneration data points is in the opposite bit region than its corresponding enrollment value. The term Single Helper Data (SHD) refers to the bitstring generated by this bit-flip avoidance scheme because the classification of the $modPND_{co}$ as strong or weak is determined solely by the enrollment data.

A second technique, referred to as the Dual Helper Data (DHD) scheme, requires that both the enrollment and regeneration $modPND_{co}$ be in strong bit regions before allowing the bit to be used in the bitstring during regeneration by either the token or verifier. In the DHD scheme, SHD is first generated by both the token and verifier and the SHD bitstrings are exchanged. A DHD bitstring is created by bit-wise 'AND'ing the two SHD bitstrings. The DHD scheme doubles the protection provided by the margin against bit-flip errors because the $modPND_c$ produced during regeneration must now move (because of UC-TVN) across both a '0' and '1' margin before it can introduce a bit-flip error. This is true because both the enrollment and regeneration $modPND_{co}$ must be classified as strong to be included in the bitstring and the strong bit regions are separated by 2*Margin. The DHD scheme also enables different bitstrings to be produced each time the token authenticates even when using the same challenges and user-specified parameters. The bitstrings constructed using only strong bits are referred to as StrongBS.

As indicated above, the Path-Select-Masks are configured by the server to select different sets of k PN among the larger set n generated by the applied challenges (2-vector sequences). In other words, the 4096 PN are not fixed, but vary from one authentication to the next. The Path-Select-Masks enables the PN to be selected by the server in an exponential n-choose-k fashion. However, the exponential n-select-k ways of selecting the PN are limited to choosing among the $n^2$ number of bits (one bit for each PND) without the Distribution Effect, which is used to vary the bit value associated with each PND. The responses are largely uncorrelated as a means of making it difficult or impossible to apply machine learning algorithms to model-build the PUF. According to the invention, the Path-Select-Masks in combination with the TVCOMP process add significant complexity to the machine-learning model. The set of PN selected by the Path-Select-Masks changes the characteristics of the PND distribution, which in turn impacts how each PND is transformed through the TVCOMP process described above in reference to Eq. (1) and Eq. (2).

Figure 2:
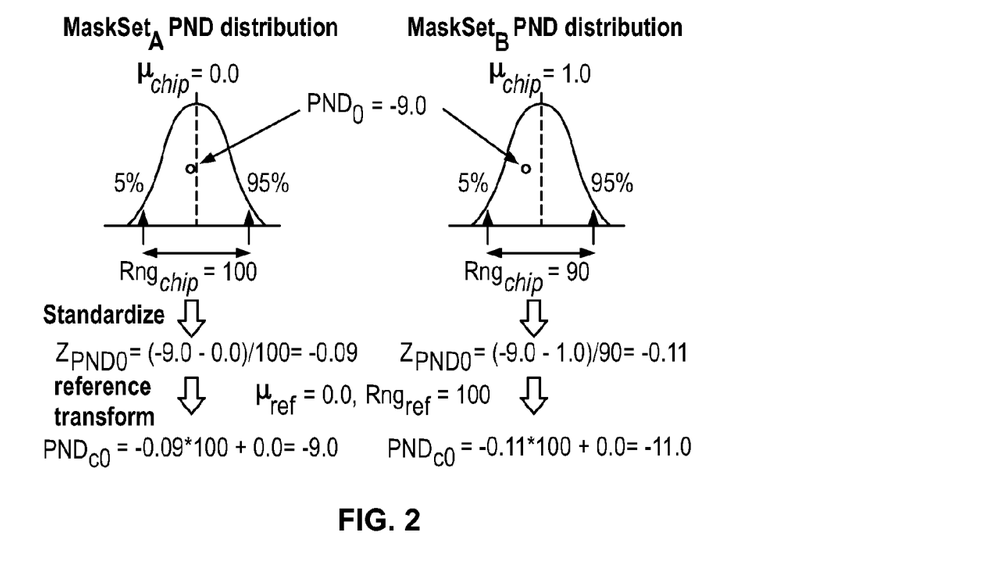
FIG. 2 is a graph illustrating the TVCOMP process according to an embodiment of the invention.

FIG. 2 provides an illustration of the TVCOMP process; specifically the impact of the TVCOMP process on $PND_0$ when members of the PND distribution change for different mask sets A and B. The two distributions are constructed using data from the same chip but selected using two different sets of Path-Select-Masks, MaskSetA and MaskSetB. The point labeled $PND_0$ is present in both distributions, with value −9.0 as labeled, but the remaining components are purposely chosen to be different. Given the two distributions are defined using distinct PND (except for one member), it is possible that the $\mu_{chip}$ and $RNG_{chip}$ parameters for the two distributions will also be different. The example shows that the $\mu_{chip}$ and $Rng_{chip}$ measured for the MaskSetA distribution are 0.0 and 100, respectively, while the values measured for the MaskSetB distribution are 1.0 and 90.

The TVCOMP process builds these distributions, measures their $\mu_{chip}$ and $Rng_{chip}$ parameters and then applies Eq. (1) to standardize the PND of both distributions. The standardized values for $PND_0$ in each distribution are shown as −0.09 and −0.11, respectively This first transformation is at the heart of the Distribution Effect, which shows that the original value of −9.0 is translated to two different standardized values. TVCOMP then applies Eq. (2) to translate the standardized values back into an integer range using $\mu_{ref}$ and $Rng_{ref}$, given as 0.0 and 100, respectively for both distributions. The final $PND_{co}$ from the two distributions are −9.0 and −11.0, respectively. This shows that the TVCOMP process creates dependency between the PND and corresponding $PND_c$ that is based on the parameters of the entire distribution.

The Distribution Effect can be leveraged by the verifier as a means of increasing the unpredictability in the generated response bitstrings. One possible strategy is to intentionally introduce skew into the $\mu_{chip}$ and $RNG_{chip}$ parameters when configuring the Path-Select-Masks as a mechanism to force diversity in bit values derived from the same PN, i.e., those PN that have been used in previous authentications. The sorting-based technique described in the next section represents one such technique that can be used by the server for this purpose.

According to one embodiment of the invention, a set of PN distributions are constructed using a specialized process that enables a systematic evaluation of the Distribution Effect. As indicated earlier, the number of possible PN distributions is exponential (n-choose-k), making it impossible to enumerate and analyze all possibilities. The fixed number of data sets constructed therefore represents only a small sample from this exponential space. However, the specialized construction process described below illustrates two important concepts, namely, the ease in which bitstring diversity can be introduced through the Distribution Effect, and the near ideal results that can be achieved, i.e., the ability to create bitstrings using the same PN that possess a 50% Interchip Hamming distance.

The distributions constructed include a fixed set of 300 rising and 300 falling PN drawn randomly from 'Master' rise and fall PN data sets, for example a size of 7271. The bitstrings evaluated use only these PN, which are subsequently processed into PND, $PND_c$ and $modPND_c$ in exactly the same way except for the $\mu_{chip}$ and $Rng_{chip}$ used within TVCOMP process. $\mu_{chip}$ and $Rng_{chip}$ of each distribution are determined using a larger set (e.g., 2048) of rise and fall PN, which includes the fixed sets of size 300 plus two sets of size 1748 (2048-300) drawn randomly each time from the Master rise and fall PN data sets. Therefore, the $\mu_{chip}$ and $Rng_{chip}$ parameters of these constructed distributions are largely determined by the 1748 randomly selected rise and fall PN. A windowing technique is used to constrain the randomly selected 1748 rise and fall PN to ensure systematic evaluation.

The Master PND distribution is constructed from the Master rising PN (PNR) and falling PN (PNF) distributions in the following fashion. The 7271 elements from the PNR and PNF Master distributions are first sorted according to their worst-case simulation delays. The rising PN distribution is sorted from largest to smallest while the falling PN distribution is sorted from smallest to largest. The Master PND distribution is then created by subtracting consecutive pairings of PNR and PNF from these sorted lists, i.e., $PND_i = PNR_i - PNF_i$ for i=0 to 7271. This construction process creates a Master PND distribution that possesses the largest possible range among all possible PNR/PNF pairing strategies.

Figure 3:
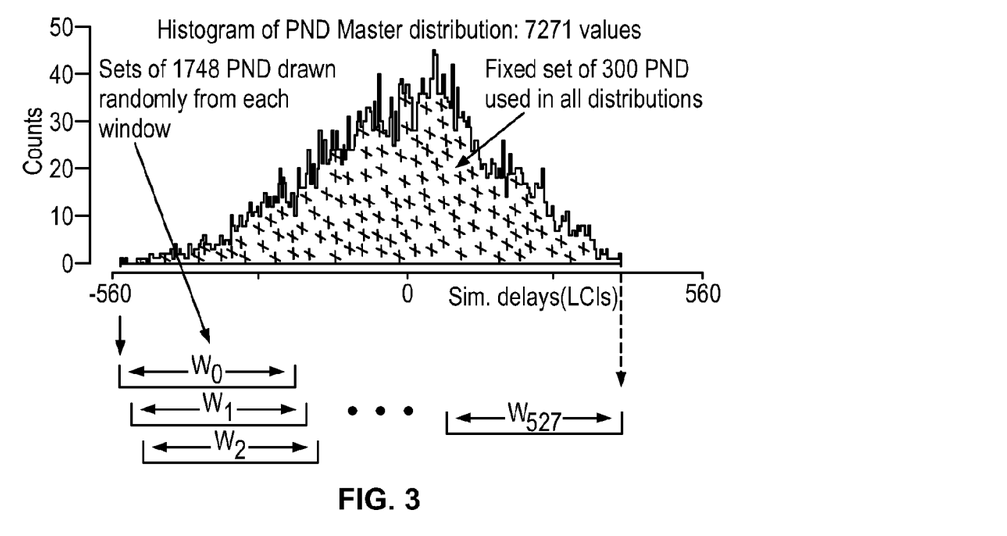
FIG. 3 is a histogram portraying the PND Master distribution according to an embodiment of the invention.

A histogram portraying the PND Master distribution is shown in FIG. 3. The PNR and PNF Master distributions from which this distribution is created were created from simulations of the sbox-mixedcol functional unit described above using approximately 1000 challenges (2-vector sequences). The range of the PND is given by the width of the histogram as approximately 1000 LCIs (~18 ns).

The 2048 rise and fall PN used in the set of distributions evaluated are selected from this Master PND distribution. The PND Master distribution (unlike the PNR and PNF Master distributions) permits distributions to be created such that the change in the $\mu_{chip}$ and $RNG_{chip}$ parameters from one distribution to the next is controlled to a small delta. The 'x's in FIG. 3 illustratively portray that the set of 300 fixed PND (and corresponding PNR and PNF) are randomly selected across the entire distribution. These 300 PND are then removed from Master PND distribution. The remaining 1748 PND for each distribution are selected from specific regions of the Master PND distribution as a means of constraining the $\mu_{chip}$ and $Rng_{chip}$ parameters. The regions are called windows in the Master PND distribution and are labeled $W_x$ along the bottom of FIG. 3.

The windows $W_x$ are sized to contain 2000 PND and therefore, the width of each $W_x$ varies according to the density of the distribution. Each consecutive window is skewed to the right by 10 elements in the Master PND distribution. Given the Master contains 7271 total elements, this allows 528 windows (and distributions) to be created. The 2048 PND for each of these 528 distributions, referred to as $W_x$ distributions, are then used as input to the TVCOMP process. The 300 fixed PND are present in all distributions and therefore, prior to TVCOMP, they are identical in value.

The objective of this analysis is to determine how much the bitstrings change as the $\mu_{chip}$ and $RNG_{chip}$ parameters of the $W_x$ distributions vary. As noted earlier, the bitstrings are constructed using only the 300 fixed PND, and are therefore of size 300 bits. The changes to the bitstrings are measured using a reference bitstring, i.e., the bitstring generated using the $W_0$ distribution. Interchip Hamming distance (InterchipHD) counts the number of bits that are different between the $W_0$ bitstring and each of the bitstrings generated by the $W_x$ distributions, for x=1 to 527.

Figure 4:
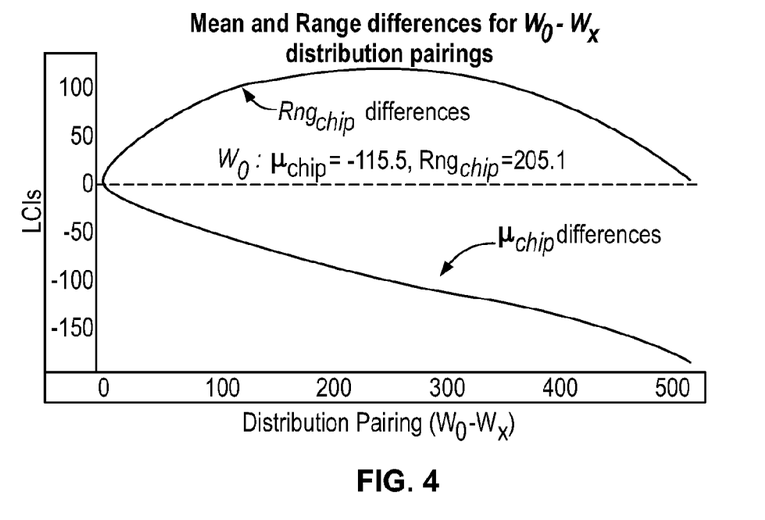
FIG. 4 plots the average difference in $\mu_{chip}$ and $RNG_{chip}$ of each $W_0$-$W_x$ pairing according to an embodiment of the invention.

The construction process used to create the $W_0$-$W_x$ distribution pairings ensures that a difference exists in the $\mu_{chip}$ and $Rng_{chip}$ parameters. FIG. 4 plots the average difference in $\mu_{chip}$ and $Rng_{chip}$ of each $W_0$-$W_x$ pairing, using FPGA data measured from the 500 chip-instances. The differences are created by subtracting the $W_x$ parameter values, e.g., $\mu_{chipWx}$ and $Rng_{chipWx}$ from the reference $W_0$ parameter values, e.g., $\mu_{chipW0}$ and $Rng_{chipW0}$. The $W_0$ distribution parameters are given as $\mu_{chip}$=−115.5 and $Rng_{chip}$=205.1 in the figure. As the window is shifted to the right, the mean increases towards 0, and the corresponding ($W_0$-$W_x$) difference becomes more negative in nearly a linear fashion as shown by the curve labeled '$\mu_{chip}$ differences'. Using the $W_0$ values, µchip varies over the range from −115 to approximately +55. The range, on the other hand, decreases as window shifts to the right because the width of the window contracts (due to the increased density in the histogram), until the mid-point of the distribution is reached. Once the mid-point is reached, the range begins to increase again. Using the $W_0$ values, $RNG_{chip}$ varies from 205 down to approximately 105 at the mid-point. It is contemplated the results that follow represent a conservative subset of all possible distributions. In addition, $Rng_{chip}$ continues to change throughout the set of $W_x$ distributions.

Figure 5:
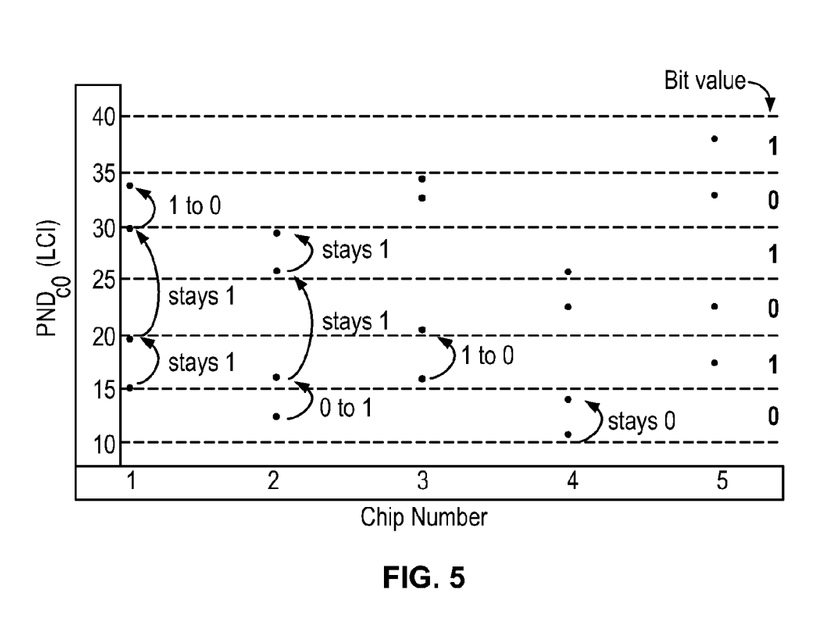
FIG. 5 provides an illustration of the Distribution Effect using data from several chip-instances according to an embodiment of the invention.

FIG. 5 provides an illustration of the Distribution Effect using data from several chip-instances. The effect on $PND_{co}$ is shown for 5 chips given along the x-axis for four windows given as $W_0$, $W_{25}$, $W_{50}$ and $W_{75}$. The bottom-most points are the $PND_{co}$ for the distribution associated with $W_0$. As the index of the window increases, the $PND_{co}$ from those distributions is skewed upwards. A modulus grid of 20 is shown superimposed to illustrate how the corresponding bit values change as the parameters of the distributions change.

InterchipHD is used to measure the number of bits that change value across the 527 $W_0$-$W_x$ distributions. It is important to note that InterchipHD is applied to only those portions of the bitstring that correspond to the fixed set of 300 PN. InterchipHD counts the number of bits that differ between pairs of bitstrings. In order to provide an evaluation that does not artificially enhance the InterchipHD towards its ideal value of 50%, the bits compared in the InterchipHD calculation must be generated from the same $modPND_c$.

Figure 6:
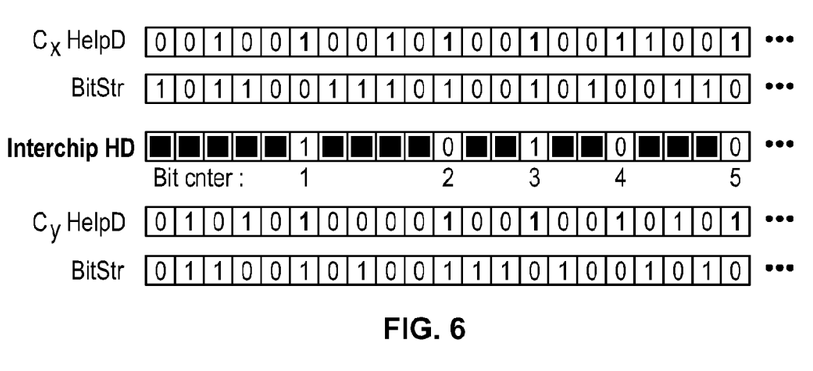
FIG. 6 illustrates a hammering distance (InterchipHD) process according to an embodiment of the invention.

FIG. 6 provides an illustration of the InterchipHD process used for ensuring a fair evaluation of two HELP-generated bitstrings. The helper data bitstrings HelpD and raw bitstrings BitStr or two chips $C_x$ and $C_y$ are shown along the top and bottom of the FIG. 6, respectively The HelpD bitstrings classify the corresponding raw bit as weak using a '0' and as strong using a '1'. The InterchipHD is computed by XOR'ing only those BitStr bits from the $C_x$ and $C_y$ that have BOTH HelpD bits set to i.e., both raw bits are classified as strong. This process maintains alignment in the two bitstrings and ensures the same $modPND_c$/$modPND_{co}$ from $C_x$ and $C_y$ are being used in the InterchipHD calculation. Note that the number of bits considered in each InterchipHD is less than 300 using this method, and is different for each pairing.

Eq. (3) provides the expression for InterchipHD, that takes into consideration the varying lengths of the individual InterchipHDs. The symbols NC, $N_{Bx}$ and NCC represent 'number of chips', 'number of bits' and 'number of chip combinations', respectively:

$$InterchipHD = \left( \frac{1}{NCC} \sum_{i=1}^{NC} \sum_{j=i+1}^{NC} \frac{\left( \sum_{k=1}^{NB_x} (BS_{i,k} \otimes BS_{j,k}) \right)}{NB_x} \right) \times 100 \quad \text{Equation (3)}$$

Five hundred (500) chip-instances are used for the 'number of chips', which yields 500*499/2=124,750 for NCC. This equation simply sums all the bitwise differences between each of the possible pairing of chip-instance bitstrings BS as described above and then converts the sum into a percentage by dividing by the total number of bits that were examined. The final value of "Bit cnter" from the center of FIG. 6 counts the number of bits that are used for NBx in Eq. (3), which varies for each pairing as mentioned above.

Figure 7:
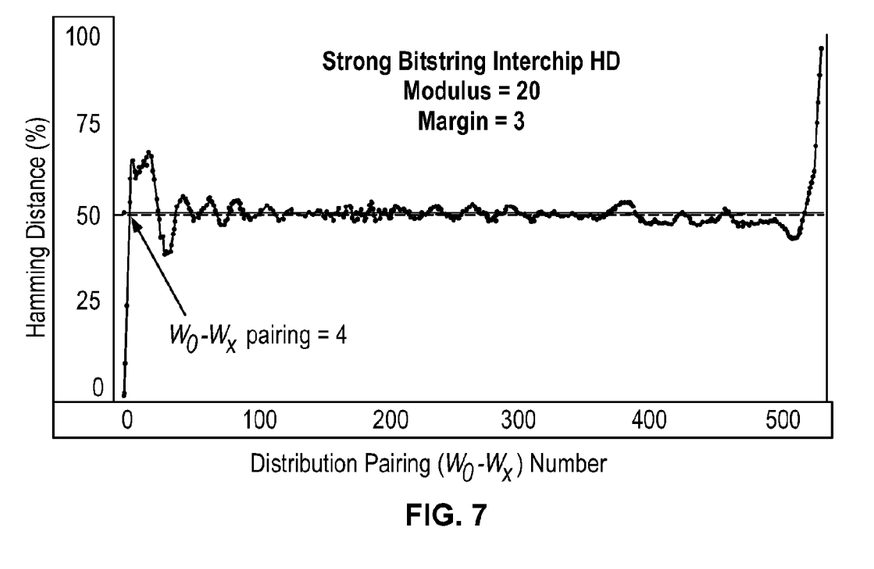
FIG. 7 illustrates InterchipHD results computed using enrollment data collected from 500 chip-instances according to an embodiment of the invention.

The InterchipHD results shown in FIG. 7 are computed using enrollment data collected from 500 chip-instances (Xilinx Zynq 7020 chip). The x-axis plots the $W_0$-$W_x$ pairing, which corresponds one-to-one with the graph shown in FIG. 4. The HELP algorithm is configured with a Modulus of 20 and a Margin of 3 in this embodiment (the results for other combinations of these parameters are similar). The HDs are nearly zero for cases in which in windows $W_0$ and $W_x$ have significant overlap (left-most points) as expected because the $\mu_{chip}$ and $RNG_{chip}$ of the two distributions are nearly identical under these conditions (see left side of FIG. 4). As the windows separate, the InterchipHDs rise quickly to the ideal value of 50% (annotated at $W_0$-$W_x$ pairing=4), demonstrating that the Distribution Effect provides significant benefit for relatively small shifts in the distribution parameters. The overshoot and undershoot on the left and right sides of the graph in FIG. 4 reflect correlations that occur in the movement of the $modPND_c$ for special case pairs of the $\mu_{chip}$ and $RNG_{chip}$ parameters. For example, for pairings in which the $Rng_{chip}$ of the two distributions are identical, shifting $\mu_{chip}$ causes all $modPND_c$ to rotate through the range of the Modulus (with wrap). For $\mu_{chip}$ shifts equal to the Modulus, the exact same bitstring is generated by both distributions. This case does not occur otherwise the curve would show instances where the InterchipHD is 0 at places other than when x=0. For $\mu_{chip}$ shifts equal to ½ Modulus (and with equal $Rng_{chip}$), the InterchipHD becomes 100%. The upward excursion of the right-most portion of the curve in FIG. 7 show results where this boundary case is approached, i.e., for x>517. Here, the $RNG_{chip}$ of both distributions (from FIG. 4) are nearly the same and only the $\mu_{chip}$ are different.

A key take-away here is that the InterchipHDs remain near the ideal value of 50% even when simple, distribution construction techniques are used. These types of construction techniques can be easily implemented by the server during authentication.

These results provide that the Distribution Effect increases bitstring diversity. As indicated earlier, the number of PND that can be created using 7271 rising and falling PN is limited to (7271)2 before considering the Distribution Effect. As presented, the number of times a particular bit can change from 0 to 1 and vice versa is proportional to the number of $\mu_{chip}$ and $Rng_{chip}$ values that yield different bit values. In general, this is a small fixed value on order of 100 so the Distribution Effect provides only a polynomial increase in the number of PND over the $n^2$ provided in the original set.

The Distribution Effect entropy-enhancing technique is proposed for the HELP PUF that is based on purposely introducing biases in the mean and range parameters of path delay distributions. The biased distributions are then used in the bitstring construction process to introduce differences in the bit values associated with path delays that would normally remain fixed. The Distribution Effect changes the bit value associated with a PUF's fixed and limited underlying source of entropy, expanding the CRP space of the PUF. The technique uses Path-Select-Masks and a TVCOMP process to vary the path delay distributions over an exponential set of possibilities. The Distribution Effect is makes the task of model-building the HELP PUF significantly more difficult.

As mentioned above, a Modulus operation is applied to the measured path delays to reduce the bias introduced by differences in the physical path length. The Modulus operator computes the remainder after dividing the path delay by specified constant, i.e, the Modulus. The Modulus operation removes most, but not all, of the bias associated with the paths of different lengths. Two methods—population-based and chip-specific—are provided that improve entropy, reliability and the length of the HELP generated bitstrings.

The offset method is designed to remove the remaining component of this bias. It accomplishes this by shifting the individual $PND_c$ upwards. The shift amount, which is always less than ½ the Modulus, is computed by the server using the enrollment data from a subset of the tokens stored in its database. The objective of the population-based offset method is to increase entropy by adjusting the population associated with each $PND_c$ such that the number of tokens which generate 0 is nearly equal to the number that generate a 1. The best results are obtained when data from the entire database is used. However, significant improvements in entropy can be obtained using smaller, randomly selected subsets of tokens in cases where the data-base is very large. Note that the offset method adds a third component to the challenge (beyond the 2-vector sequences and Path-Select-Masks).

Figure 8:
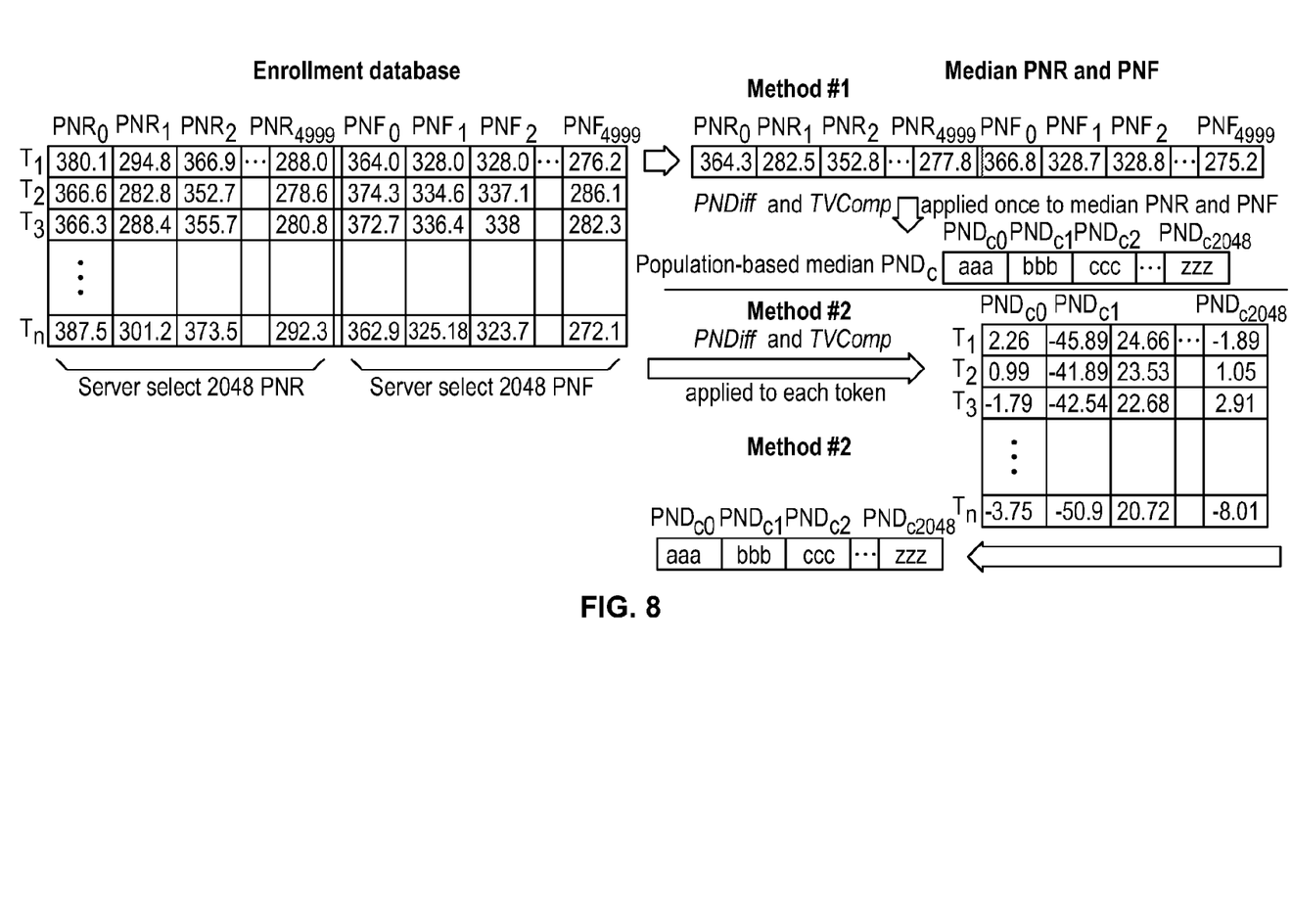
FIG. 8 illustrates an example 'Enrollment Database' with tokens as rows and PNR/PNF as columns and two alternatives to computing the medians of the $PND_c$ according to an embodiment of the invention.

In a typical authentication round, a token (fielded chip) and verifier (secure server) exchange nonces to decide on the set of HELP user-specified parameters to be used. The verifier then chooses 2048 rising PN (PNR) and 2048 falling PN (PNF) of those generated by the selected challenges (2-vector input sequences). A set of Path-Select-Masks are constructed by the server which identify these selected PNR and PNF. The challenges and Path-Select-Masks are transmitted to the token to ensure the token tests paths that correspond to the same PNR and PNF used from the server's database during the authentication round. FIG. 8 shows an example 'Enrollment Database' with tokens as rows and PNR/PNF as columns.

As noted above, the population-based offsets are applied to the $PND_c$ and not to the PNR and PNF. Therefore, the first step of the offset method is to compute $PND_c$ from the PNR and PNF stored in the database. Once $PND_c$ are available, the 'median' value for each $PND_c$ is computed. The medians partition the token population and enable the offset method to skew each $PND_c$ appropriately to meet the goal of maximizing entropy. The medians of the $PND_c$ cannot be computed off-line because the LFSR seeds, $\mu_{ref}$ and $Rng_{ref}$ parameters used to create the $PND_c$ are defined uniquely for each authentication round using nonces as discussed earlier.

There are two alternatives to computing the medians of the $PND_c$. The first approach is to compute the medians of the PNR and PNF from the database in advance and then apply the PNDiff operation to these precomputed median PNR and PNF after the LFSR seeds become available for the authentication round. TVComp is then applied to the set of median PND to obtain the median $PND_c$. An illustration of this method, labeled 'Method #1' is provided along the top of FIG. 8. The benefit of this approach is that it is fast because the precomputed median PNR and PNF are leveraged and only one PNDiff and TVComp operation are required to obtain the median $PND_c$.

The second approach computes the PND and $PND_c$ from each of the token PNR and PNF individually (note again that only a subset n of the tokens are used in the population-based offset method). This requires n applications of the PNDiff and TVComp operations, once for each of the n tokens. The median $PND_c$ can then be computed from these sets of $PND_c$. An illustration of this second method, labeled 'Method #2' is provided along the bottom of FIG. 8. Method #2 requires more compute time by the server but provides higher levels of entropy in the resulting bitstrings.

Once the 2048 median $PND_c$ are available, the population-based offsets are computed for each of the token's 2048 $PND_c$ used in the authentication round. The population-based offsets are integers that discretize the vertical distance from each median $PND_c$ to the nearest 0-1 line located above the median $PND_c$. The integer range for each offset is 0 to 2OB, with OB representing the number of offset bits used for each offset (OB is a server-defined parameter). The token and server multiply these integers by the Offset Resolution (OR) to obtain the actual (floating point) offsets added to the $PND_c$. Larger OB provide higher resolution but also have higher overhead. Eq. (4) expresses the Offset Resolution (OR) as a function of the number of Offset Bits (OB). For example, using a 4-bit offset indicates that the offset data transmitted to the token is 4*2048=8192 bits in length. If a Modulus of 20 is used, then the OR is $20/2^{4+1}=20/32=0.625$. Therefore, offsets specified using 4 bits vary from 0 and 16 and allow upward floating point skews of 0, 0.6250, 1.25 . . . 10.0000 to be added to each of the 2048 $PND_c$. The $PND_c$ with offset applied are referred to as $PND_{co}$.

$$OR = \frac{Modulus}{2^{OB+1}} \qquad \text{Equation (4)}$$

Figure 9:
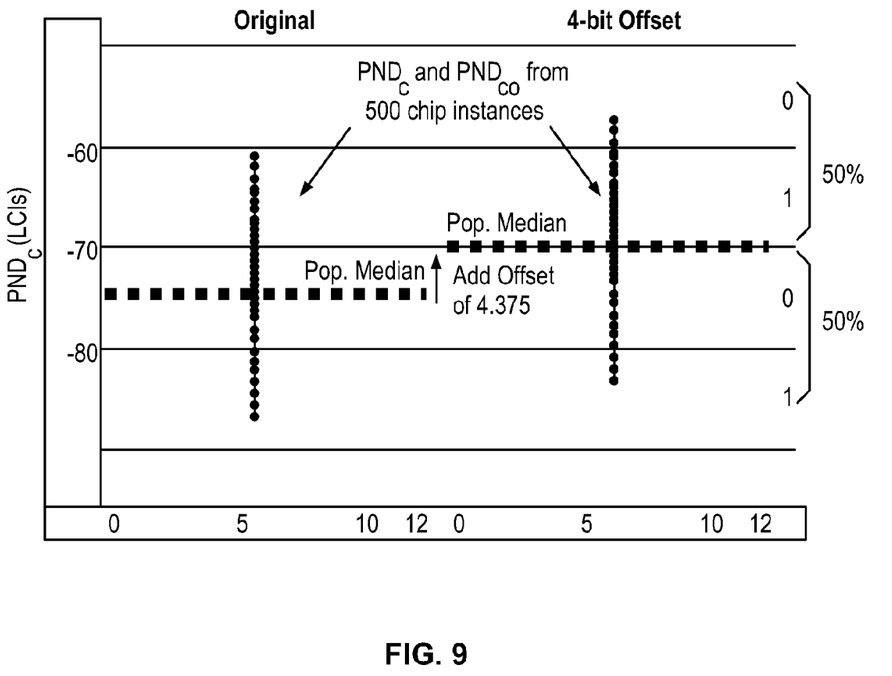
FIG. 9 provides an example illustration of the process using one PNDc.

FIG. 9 provides an example illustration of the process using one $PND_c$. The points in the vertical line graph represent this $PND_c$ derived from 500 PNR and PNF token data sets stored in the Enrollment Database. The median $PND_c$ value is shown as the horizontal dotted line. The server computes the distance between the median and the center-located 0-1 line as 4.375, which is encoded as an offset of 7 using an OB=4-bit offset scheme (7*0.625=4.375). The token adds this offset to the corresponding $PND_c$ it computes.

Under the condition that this same offset is used by all tokens for this particular $PND_c$, the shift ensures that half of the tokens place this $PND_c$ above the 0-1 line and half place it below. Note that this does not guarantee an equal number of 0's and 1's because it is possible the spread of the distribution exceeds the width of the Modulus (FIG. 9 illustrates this case). The distribution of points would need to be uniform and/or symmetric over the width of the distribution to guarantee equality. Although such 'ideal' distributions are rare in practice, most $PND_c$ distributions possess only minor deviations from this ideal case, and therefore, nearly a full bit of entropy is obtained as we show in the results section.

Note that the offsets leak no information about the corresponding bit that is assigned to the $PND_{co}$. This is true because the offsets are computed using the $PND_c$ from the token population and therefore, no chip-specific information is present in the offsets computed and transmitted by the server to the token. Also note that it is possible to insert the offsets into unused bits of the Path-Select-Masks, reducing the transmission overhead associated with the offset method. Unused bits in the Path-Select-Masks correspond to functional unit outputs that do not produce transitions under the applied 2-vector sequence. These bit positions in the Path-Select-Masks can be quickly and easily identified by both the server and token, allowing the offsets to be transparently inserted and removed in these masks.

Figure 10A:
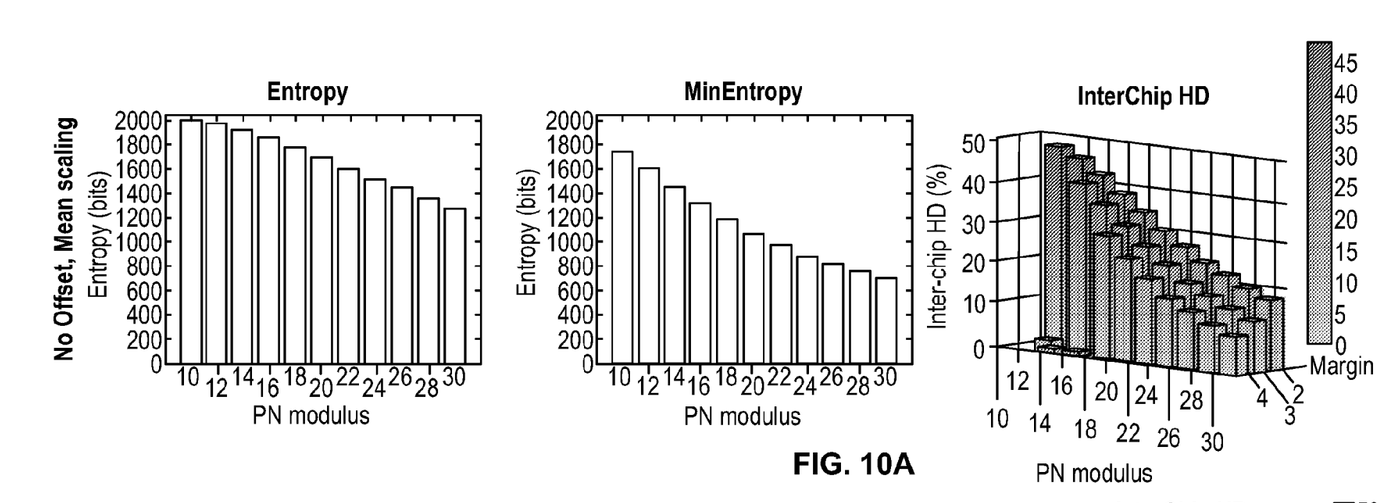
FIG. 10A illustrates bar graphs of data related to Entropy, MinEntropy and InterchipHD according to an embodiment of the invention.
Figure 10B:
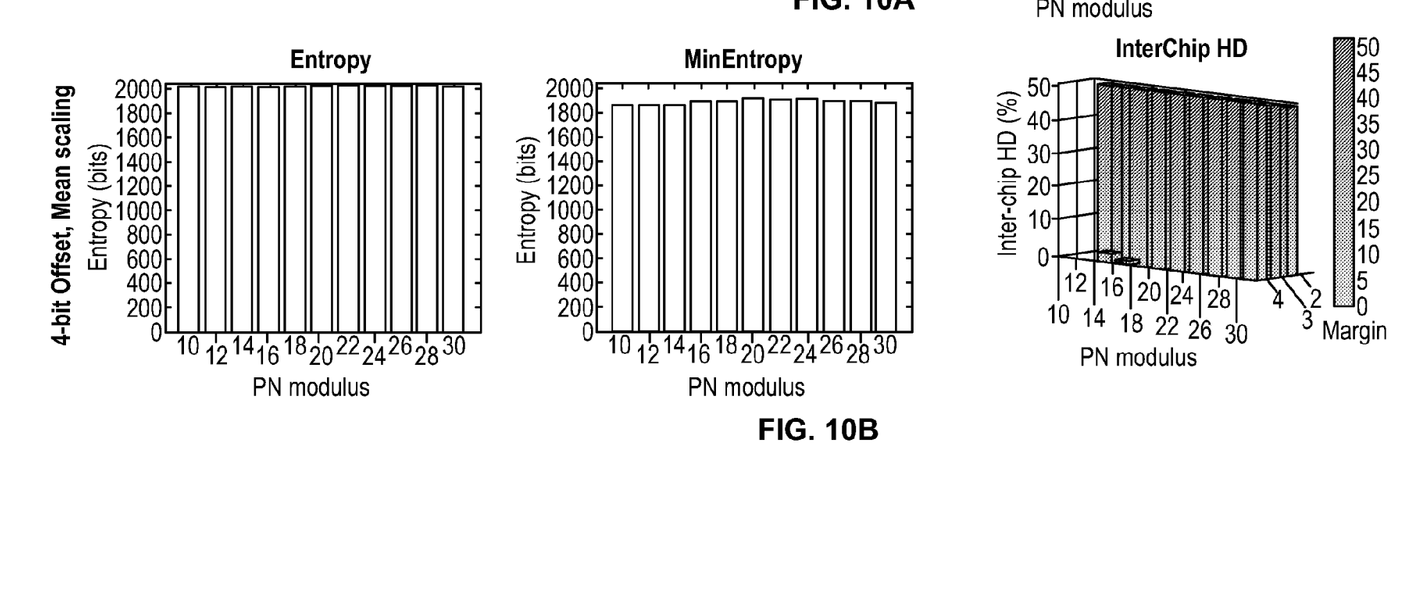
FIG. 10B illustrates bar graphs of data subject to a 4-bit offset related to Entropy, MinEntropy and InterchipHD according to an embodiment of the invention.

The offset method was applied to the data collected from a set of 500 Xilinx Zynq FPGAs. The results are shown in two rows of bar graphs in FIG. 10A and FIG. 10B to make it easy to visualize the improvements provided by the offset method. The first row shown in FIG. 10A gives results without offsets while the second row shown in FIG. 10B gives the results when using a 4-bit offset. Mean scaling refers to values that are assigned to $\mu_{ref}$ and $Rng_{ref}$ in the TVComp processing. Results using other scaling factors are similar.

The first columns of FIG. 10A and FIG. 10B each present bar graphs of Entropy and MinEntropy for Moduli 10 through 30 (x-axis). Entropy is defined by Eq. (5) and MinEntropy by Eq. (6):

$$H(X) = \sum_{i=0}^{2047} \sum_{j=0}^{1} p_{ij} \log_2(p_{ij}) \quad \text{Equation (5)}$$

$$H(X) = \sum_{i=0}^{2047} \sum_{j=0}^{1} p_{ij} \log_2(p_{ij}) \quad \text{Equation (6)}$$

The frequency $p_{ij}$ of '0's and '1's is computed at each bit position i across the 500 bitstrings of size 2048 bits, i.e, no Margin is used in this analysis. The height of the bars represent the average values computed using the 2048-bit bitstrings from 500 chips, averaged across 10 separate LFSR seed pairs. Entropy varies from 1200 to 2040 for the 'No Offset' case shown in the first row and between 2037 to 2043 with the 4-bit offset. The results using ofsets are close to the ideal value of 2048 and are nearly independent of the Modulus. Similarly, for MinEntropy, the 'No Offset' results vary from approximately 700 for large Moduli up to approximately 1750 for a Modulus of 10. On the other hand, MinEntropy using the 4-bit offset method vary from 1862 at Moduli 12 up to 1919, which indicates that each bit contributes between 91% and 93.7% to entropy in the worst case.

The third column gives the results for inter-chip Hamming distance (InterchipHD), again computed using the bitstrings from 500 chips, averaged across 10 separate LFSR seed pairs. Hamming distance is computed between all possible pairings of bitstrings, i.e., 500*499/2=124,750 pairings for each seed and then averaged.

The values for a set of Margins of size 2 through 4 (y-axis) are shown for each of the Moduli. Again, FIG. 6 provides an illustration of the process used for dealing with weak and strong bits under HELP's Margin scheme in the InterchipHD calculation. The InterchipHD is computed separately for each of the 10 seed pairs and the average value is given in the last column of FIG. 10A and FIG. 10B. The InterchipHD vary from approximately 10% to 48% without the offset (FIG. 10A) and between 49.4% to 51.2% with the offset (FIG. 10B), again showing the significant improvement provided by the offset method, particularly for larger Moduli.

As discussed earlier, the population-based offset method described above leaks no information regarding the bit value encoded by the $modPND_{co}$, and adds significantly to the entropy of the bitstring. The size of the strong bitstrings decreases by approximately 2× to 5× when compared to the 'No Offset' case because the center of PND populations are moved over the 0-1 line, and the density of the PND is largest at the center of the distributions. Therefore, the bits generated by a larger fraction of the PND are classified as weak.

The chip-specific offset method addresses these issues. The objective of the chip-specific offset method is to reduce bit-flip errors and increase the length of the strong bitstrings. Unlike the population-based offset method, the chip-specific offset method is applied to the PND for each chip, and therefore has the potential to leak information regarding the value of the corresponding bits. The amount of leakage is related to the size of the Modulus, with Moduli smaller than the range of WDV eliminating leakage completely. Therefore, larger Moduli need to be avoided. In particular, the average range of within-die variations in the 500 chip sample is 23. It is noted that results presented below use only a subset of the Moduli used in the population-based offset method.

The chip-specific offset method is complementary to the population-based method and therefore the two methods can be combined. In fact, the best results are obtained by the combined application of both methods. Note that the combined method requires only one set of offsets to be transmitted to the token and is therefore similar in overhead to either of the individual methods. Given the complementary nature of the two methods, results for only the combined method are presented below.

Figure 11A:
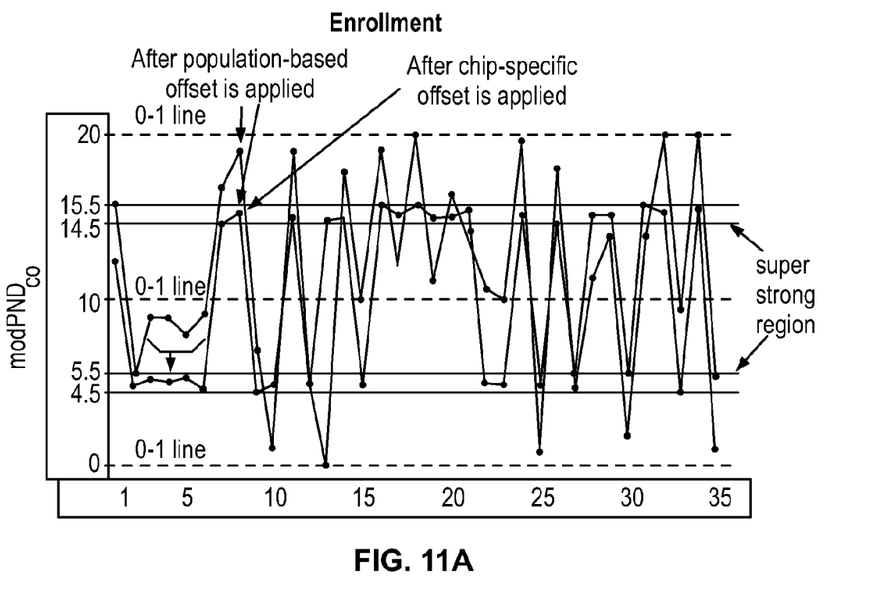
FIG. 11A is a graph illustrating modifications made to $modPND_{co}$ with a chip-specific offset applied according to an embodiment of the invention.

The objective of the chip-specific method is illustrated in FIG. 11A using a small subset of the $modPND_{co}$ produced by chip $C_1$ under Enrollment conditions. One curve represents the $modPND_{co}$ after population-based offsets are applied (Pop. Offset). The chip-specific method applies a second offset to these $modPND_{co}$ to shift them to one of two regions labeled 'super strong region'. Another curve depicts the $modPND_{co}$ with both offsets applied (Pop.+Chip Offset). The super strong regions are located in the center of the 0 and 1 regions, i.e., at vertical positions furthest from the 0-1 lines, and therefore they represent the positions that maximally protect against bit-flip errors. The server adds the population-based offsets to the chip-specific offsets to produce a final set of offsets. Although not apparent, the Offset Resolution (OR) given by Eq. (4) is doubled in magnitude to allow the server to specify offsets that traverse the entire Modulus range. For example, the Offset Resolution for a 4-bit offset and a Modulus of 20 is increased to 20/24=20/16=1.25.

Figure 11B:
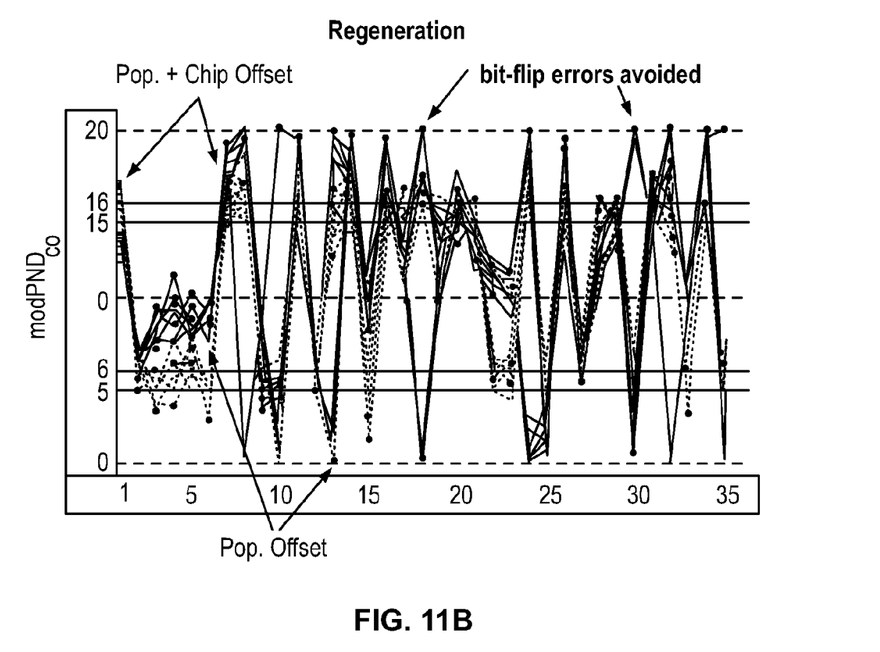
FIG. 11B is a graph illustrating modifications made to $modPND_{co}$ with a population-based offset applied in addition to a population-based offset combined with chip-specific offset according to an embodiment of the invention.

During regeneration, the server transmits the offsets to the token as a component of the challenge and the token applies them to the regenerated $PND_c$. Certain curves in FIG. 11B show the $modPND_{co}$ using population-based offsets only while the other curves show the $modPND_{co}$ under the combined scheme. There are 12 curves in each group, one for each of the 12 temperature-voltage corners used in the hardware experiments. The combined offset scheme provides additional resilience against bit-flip errors (several bit-flip error cases using a zero Margin scheme are identified in the figure).

Note that the enrollment helper data under the chip-specific offset (and combined) methods is all 1's, i.e., all enrollment $modPND_{co}$ are in strong bit regions, and is therefore not needed in the DualHelperData (DHD) scheme. However, the helper data generated by the token commonly has both 0's and 1's because the regenerated $modPND_{co}$ can fall within a weak region. Therefore, the DHD scheme can be layered on top of the offset methods to further improve reliability.

The population-based offset method improves entropy significantly by shifting path delay distributions such that the generated bitstrings have nearly equal numbers of 0's and 1's. The tuning is designed to center the populations over the 0-1 lines used during the bitstring generation process, as a means of increasing the entropy per bit toward the ideal value of 50%. The chip-specific offset method, on the other hand, is designed to reduce bit-flip errors and to increase the length of the strong bitstrings. Both offset methods are low in overhead and their effectiveness is demonstrated using hardware data collected from a set of FPGAs.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A Physically Unclonable Function (PUF)-based authentication method between a hardware token and verifier, comprising the steps:
   storing, by the verifier, a set of path delays from a plurality of tokens in a secure database;
   selecting, by the verifier, from the set a distribution of path delays;
   computing, by the verifier, a median value of each path delay;
   storing, by the verifier, the median value of each path delay in a set of median values;
   selecting, by the verifier, a Modulus operation that computes a difference between each median path delay and a specified constant;
   computing, by the verifier, the difference between each mean path delay and the specified constant to provide offset values;
   encoding, by the verifier, the offset values;
   sending, by the verifier, to the token the encoded offset values;
   adding, by the verifier, the offset values to the path delays to shift the distribution of path delays; and
   generating, by the verifier, a bitstring from the path delays, wherein a value of each bit of the bitstring depends on the shifted distribution.

2. The PUF-based authentication method according to claim 1, wherein the enrollment phase occurs before the token is released for field use.

3. The PUF-based authentication method according to claim 1, wherein the shifted distributions of the path delays maximizes entropy of each generated bit.

* * * * *